(12) United States Patent
Little (10) Patent No.: US 12,517,741 B2
(45) Date of Patent: Jan. 6, 2026

(54) USER INTERFACES FOR LESSONS AND AUDIO PLUGINS IN SOUND ENGINEERING APPLICATION ON TOUCH DEVICE

(71) Applicant: Apple Inc., Cupertino, CA (US)

(72) Inventor: Alec H. Little, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/314,777

(22) Filed: May 9, 2023

(65) Prior Publication Data

US 2024/0303098 A1 Sep. 12, 2024

Related U.S. Application Data

(63) Continuation-in-part of application No. 29/886,563, filed on Mar. 9, 2023.

(60) Provisional application No. 63/501,120, filed on May 9, 2023.

(51) Int. Cl.
*G06F 9/451* (2018.01)
*G06F 3/0481* (2022.01)
*G06F 3/0486* (2013.01)
*G06F 3/0488* (2022.01)
*G09B 5/02* (2006.01)
*G10H 1/00* (2006.01)

(52) U.S. Cl.
CPC .......... *G06F 9/453* (2018.02); *G06F 3/0481* (2013.01); *G06F 3/0486* (2013.01); *G06F 3/0488* (2013.01); *G09B 5/02* (2013.01); *G10H 1/0008* (2013.01); *G10H 2220/096* (2013.01)

(58) Field of Classification Search
CPC .............. G06F 9/453; G06F 3/0481
See application file for complete search history.

(56) References Cited

U.S. PATENT DOCUMENTS

| 6,904,565 B1 * | 6/2005 | Lentz | G06F 9/453 |
| | | | 715/764 |
| 2003/0020756 A1 * | 1/2003 | Bates | G09G 5/14 |
| | | | 715/788 |
| 2005/0138559 A1 * | 6/2005 | Santos-Gomez | G06F 9/453 |
| | | | 715/713 |

(Continued)

FOREIGN PATENT DOCUMENTS

WO WO-2020150518 A1 * 7/2020 .......... G06F 11/3438

*Primary Examiner* — Asher D Kells (74) *Attorney, Agent, or Firm* — Invoke (57) ABSTRACT

A computing device may include an application operating in a learning mode. When in the learning mode, an instruction panel is provided over a full version of the application to guide the user through use and understanding of the application. The instruction panel displays, in sequential order, instructional slides from a selected tutorial. Each instructional slide of the set of instructional slides may include instructions to a user to perform an operation or otherwise engage the interface as part of the selected tutorial. The application monitors the user's interactions with GUI to determine whether the operation provided for in the instructional slide has been completed. In response to determining that the user interactions with the GUI completed the operation provided on the instructional slide, the instruction panel updates the instruction panel to display the next instructional slide in the set of instructional slides for the selected tutorial.

20 Claims, 5 Drawing Sheets

(56) References Cited

U.S. PATENT DOCUMENTS

| | | | |
|---|---|---|---|
| 2006/0053372 A1* | 3/2006 | Adkins | G09B 7/02 715/709 |
| 2006/0277468 A1* | 12/2006 | Sapir | G06F 9/453 715/708 |
| 2009/0132919 A1* | 5/2009 | Allen, Jr. | G06F 9/453 715/708 |
| 2013/0125041 A1* | 5/2013 | Doan | G06F 9/451 715/781 |
| 2013/0197899 A1* | 8/2013 | Roulland | G06Q 10/20 704/9 |
| 2014/0129932 A1* | 5/2014 | Ali | G06Q 30/0643 715/702 |
| 2014/0173474 A1* | 6/2014 | Klemenz | G06F 3/0481 715/765 |
| 2015/0301729 A1* | 10/2015 | Wang | G06F 3/0485 715/707 |
| 2016/0132205 A1* | 5/2016 | Ramakrishnan | G06F 3/04817 715/765 |
| 2016/0350137 A1* | 12/2016 | Kihara | G06F 9/453 |
| 2020/0043363 A1* | 2/2020 | Grossman | G09B 19/0053 |
| 2022/0004286 A1* | 1/2022 | Alldredge | G06F 9/453 |
| 2022/0050582 A1* | 2/2022 | Zhou | G06F 3/0485 |
| 2022/0091863 A1* | 3/2022 | Ignatowicz | G06F 9/5027 |
| 2022/0156094 A1* | 5/2022 | Morrise | G06F 3/04817 |
| 2022/0366810 A1* | 11/2022 | Chan | G06F 3/04815 |
| 2023/0376555 A1* | 11/2023 | Jalasutram | G06F 3/0482 |

* cited by examiner

USER INTERFACES FOR LESSONS AND AUDIO PLUGINS IN SOUND ENGINEERING APPLICATION ON TOUCH DEVICE

INCORPORATION BY REFERENCE; DISCLAIMER

Each of the following applications are hereby incorporated by reference: application Ser. No. 63/501,120 filed on May 9, 2023; Design patent application Ser. No. 29886563 filed on Mar. 9, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to applications for creating, recording, editing, mixing, and mastering media, and to applications for instructing use on the same.

BACKGROUND

Applications for media production include various tools for recording, editing, arranging, and mixing digital media. Currently available production applications generally include a myriad of user interface elements for performing different functions. Engaging the interface elements using a traditional cursor controlled with a mouse or touchpad limits a user's ability to interact with the interface elements. Further, available media production applications are limited in how tutorials or instructional guides are presented and how users interact with the tutorials.

OVERVIEW

In some implementations, a computing device can include an application operating in a learning mode. When in the learning mode, an instruction panel is provided over a full version of the application to guide the user through use and understanding of the application. The instruction panel displays, in sequential order, instructional slides from a selected tutorial. Each instructional slide of the set of instructional slides may include instructions to a user to perform an operation or otherwise engage the interface as part of the selected tutorial. The application monitors the user's interactions with GUI to determine whether the operation provided for in the instructional slide has been completed. In response to determining that the user interactions with the GUI completed the operation indicated on the instructional slide, the instruction panel updates the instruction panel to display the next instructional slide in the set of instructional slides for the selected tutorial. The instructions provided in the instructional slides may be accompanied by visual queues that guide the user toward interface elements of the GUI that are associated with the instructions.

Particular implementations provide at least the following advantages. Recognizing that a user has performed an operation displayed in an instruction panel and auto advancing the instruction panel is a feature not present in conventional applications. Another feature not present in conventional applications includes one or more guidance indicates for visually identifying a location and action for a user to perform in response to instructions provided on an instructional panel of the tutorial. Additionally, use of touch controls allows user input that is not possible with traditional cursor-controlled input, including, for example, multiple simultaneous touches.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Learning Mode

Figure 1:
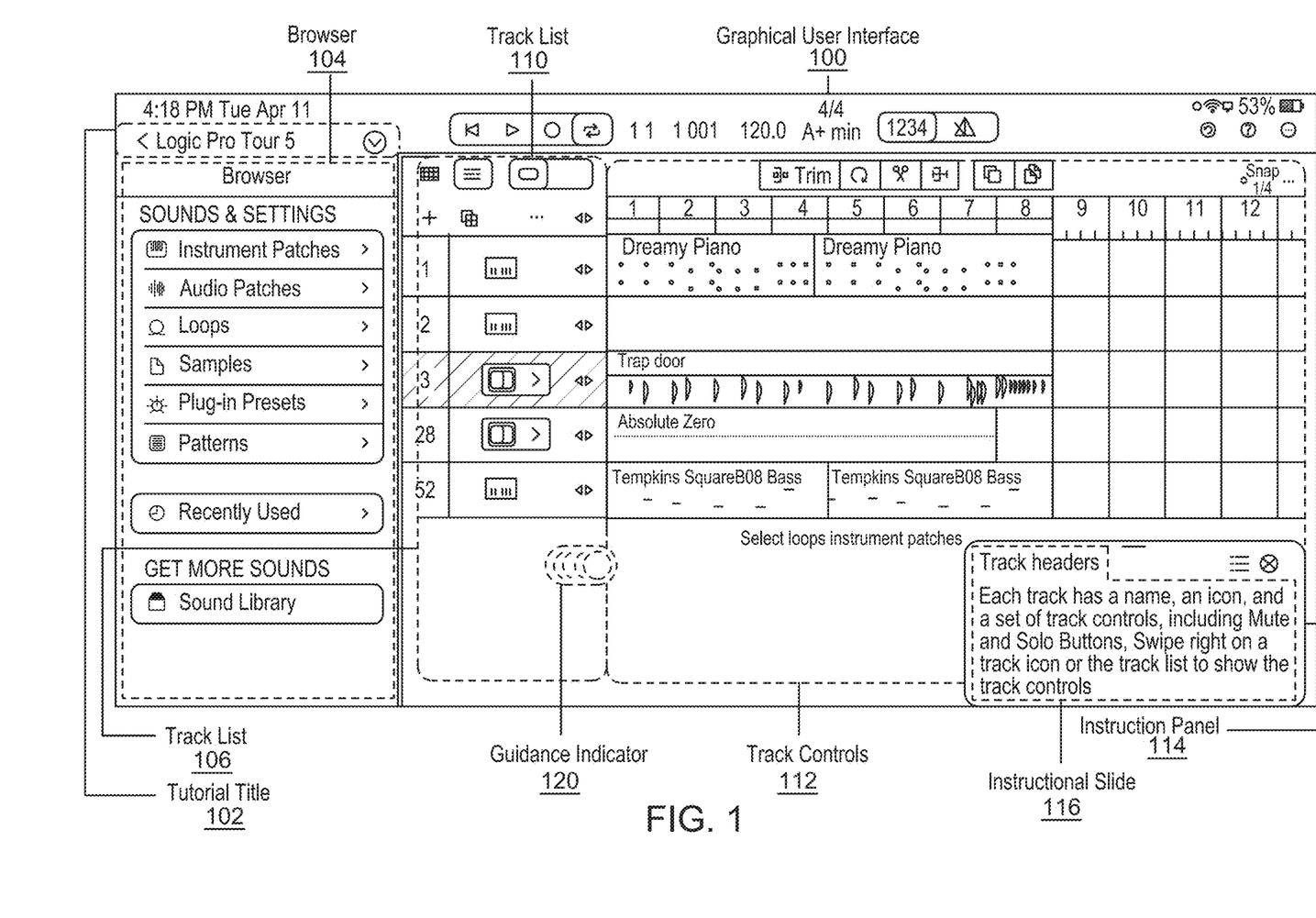
FIG. 1 is a screen shot of an application in learning mode.

FIG. 1 is a screenshot illustrating an application in a learning mode. In the learning mode, the application includes all the same functionality of the application as when the application is in a non-learning or fully functional mode. Various functions may be disabled or restricted while in the learning mode as necessitated by the tutorial being presented. For example, when a tutorial explaining how to edit a media sample is being presented, the media production application prevents the user from closing an interface in which the media sample is edited. Any attempt to close the interface by the user elicits a prompt indicating that that feature must remain open.

When in the learning mode, graphic user interface (GUI) 100 for the media production application includes a tutorial title 102 displayed in an upper left-hand corner of the GUI 100. As shown in FIG. 1, the title of the tutorial identified in the tutorial title 102 is "Logic Pro Tour 5". Selection of the "<" glyph before the tutorial title allows a user to select a different tutorial from a collection of tutorials. Selection of the "V" glyph after the tutorial title minimizes or closes a browser 104 located below the tutorial name 102. The tutorials may be created in a separate application and are separable from the media production application.

Below the tutorial title 102 in the GUI 100 is the browser 104. The browser 104 displays content that is available for manipulation using the media production application. The browser 104 is used to filter and sort through a database of content to identify media samples for use in the media production application. Available content includes "Instrument Patches", "Audio Patches", "Loops", "Samples", "Plug-in Presets", and "Patterns".

To the right of the browser 104 is a track list 110, and to the right of the track list 110 are track controls 112. The track list 110 includes a display of one or more tracks in an abbreviated or simplified manner. The track controls 112 include display of the one or more tracks in an expanded view. The expanded view of the tracks includes a track title and a visual representation of the content for each of the tracks. The track controls 112 also provides a user the ability to manipulate the tracks identified in the track list 112. The track controls 112 may be minimized or closed altogether in an effort to best utilize space within the GUI 100.

An instruction panel 114 is selectively positioned about the GUI 100. By touching and then holding anywhere on the instruction panel 114, after a selected period of time, a user is able to position the instruction panel 114 anywhere on the GUI 100. When the instruction panel 114 is positioned in location over an item being described or referred to in currently presented instructional side, thereby obstructing a user from seeing the item, the media production application will automatically reposition the instruction panel 114 to another location that does not obstruct the item being described.

The instruction panel 114 displays a set of instructional slides. The instructional slides are viewable by the user in a sequential order. The instruction panel includes a first glyph, as shown, in the form of three horizontal lines. Selection of the first glyph causes display of the set of instructional slides for the tutorial as scrollable, sequential list. The scrollable list indicates which of the instructional slides have been reviewed or completed, which instructional slide is the currently presented, and which instructional slides have yet to be reviewed or completed. The user may use this display to return to a previous instructional slide or advance to a future instructional slide. A second glyph, as shown, in the form of an "X", allows a user to close the instruction panel 114 with a tap of the second glyph. The instructional slides on the instruction panel 114 may be manually advanced or rewound using interface elements (not shown), e.g., a forward arrow and a backward arrow, located on the instruction panel 114.

Each instructional slide of the set of instructional slides includes a label, information about a topic, and instructions to the user to perform an operation related to the topic. The label is typically a descriptor of the topic addressed in the instructional slide. The information about the topic may include details about the topic. The instructions to the user may include instructions for the user to interface with an interface element or otherwise engage the GUI 100. For example, as shown in FIG. 1, an instructional slide 116 includes a label indicating "Track Headers", and provides the following information, "Each track has a name, an icon, and a set of track controls, including Mute and Solo Buttons". The instructional slide 116 continues with the following instruction, "Swipe right on a track icon or the track list to show the track controls". In this manner, the instructional slide 116 describes what tracks are and provides instruction on how to open the track controls.

The application monitors the user's interfacing with the GUI 100. When the user performs the operation that is indicated in the instructional slide that is viewable in the instruction panel 114, i.e., the current instructional side, the application recognizes that the operation has been completed and causes advancement of the instruction panel 114 to the next instructional slide in the sequence of instructional slides for the selected tutorial. The next instructional slide may include information and instructions for a similar or different topic.

Accompanying each instructional slide may be one or more guidance indicators for indicating an operation to be performed by a user. The guidance indicators may include elements indicating a tapping motion or a swiping motion or a tap and hold motion. The guidance indicators are positioned on the GUI 100 at locations where the indicated operation is to be performed as part of the tutorial. As noted above, when the instructional panel 114 happens to be positioned in a location that obstructs viewing of an item under the instruction panel 114, i.e., a guidance indicator, the application repositions the instruction panel 114 to a less obstructive location. A guidance indicator 120 illustrates an operation identified in the instructional slide 116 for the user to perform as part of the tutorial. The guidance indicator 120 is positioned at a location wherein the user is to perform a particular operation and provides a visual indication as to the operation the user is to perform. As noted above, the instructions provided on the instructional slide 116 include, "Swipe right on a track icon or the track list to show the track controls". As shown in FIG. 1, the guidance indicator 120 indicates an illustration, in broken lines, of a circle, representing a user touch of the interface, and multiple curved lines to the left of the circle indicating a motion to the right. The circle and multiple curved lines are contained within an oval. Although shown as a static element, the guidance indicator 120 may be animated, to further illustrate the action the user is to perform as part of the tutorial. The guidance indicator 120 is located within the track list 110 because opening of the track controls 112 requires performance of the operation anywhere within the track list 110. When a user performs the swiping right action anywhere other than in the interface for the track list 110, the interface for the track controls 112 will not be displayed, and the instruction panel will not automatically advance to the next instructional slide as the instruction presented to the user in the instructional slide 116 was not detected by the application as having been completed.

As shown in FIG. 1, the result of the sweeping right motion within the interface of the track list 110 is display of the track controls 112. When the application determines that user's actions with the interface completed the instruction to perform an operation displayed on the instructional slide 116, the instructional panel 114 automatically changes to a next instructional slide of the tutorial. In this manner, the application operates to auto-advance the instruction panel, thereby eliminating the need for the user to manually advance the instructional panel to the next instructional slide.

Although the learning mode and tutorial presentation are shown and described as relates to media production applications, the learning mode may be applied to any application for which a guided tutorial may be applied.

Audio Sampling

Figure 2:
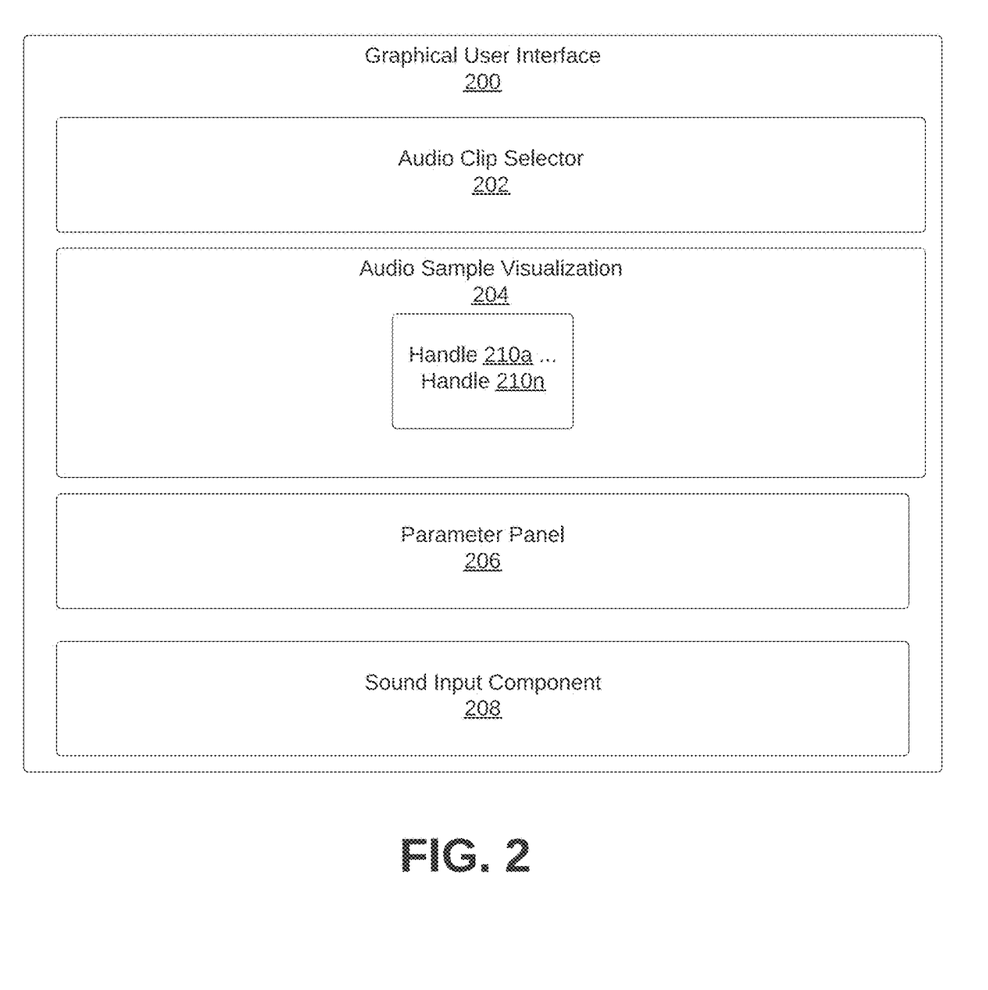
FIG. 2 is a block diagram of an example of a graphical user interface (GUI) for media production application.

FIG. 2 illustrates a block diagram of a graphical user interface (GUI) 200 of an audio sampling application. Audio sampling applications are applications used in music production that allow a user to resynthesize a sample and transform it into a unique playable instrument. Although shown and described as relating to audio, the aspects of the disclosure are equally applicable to other forms of media including video.

The GUI 200 for the audio sampling application includes the following interfaces, an audio clip selector 202, an audio sample visualization 204, a parameter panel 206, and a sound input component 208. In an effort to efficiently manage space within the GUI 200, each of the audio clip selector 202, the audio sample visualization 204, the parameter panel 206, and the sound input control component 208 include an expanded or full view display and an abbreviated or truncated display. Additionally, any of the interfaces may be closed and reopened by tapping on an interface element within the GUI 200.

The audio clip selector 202 displays one or more selected audio clips. The display of the audio clips in the audio clip selector 202 includes various interface elements for each of the audio clips that allow a user to manipulate the audio clip.

Each display also includes a visual representation of the audio clip. The audio clip selector 202 may be minimized to display only a single audio clip, e.g., the selected audio clip.

The audio sample visualization 204 displays a waveform of a media clip selected from the media clip selector 202. As will be described in further detail below, one or more handles 210a . . . 210n may be selectively positioned along the waveform to trigger various automations during playing of the audio clip. The audio sample visualization 204 includes interface elements for selecting different functions for the audio sampling application, interface elements for selecting a mode in which the audio sampling application operates, and interface elements for selecting or unselecting one or more of handles 210a . . . 210n used in the audio sample visualization 204.

Functions that are available for selection within the audio sample visualization 204 may include "Play", "Motion", and "Trim". The play function allows a user to play and manipulate pitch and timing of a sample or synthesizer sound using the sound input control component 208 or another controller. The play function also allows a user to adjust various parameters such as pitch, velocity, and timing, as well as apply effects such as reverb or delay. The motion function allows a user to add movement and variation to the sound over time by modulating various parameters. The motion function also allows a user to adjust various parameters such as speed, direction, and depth in real-time. The trim function allows a user to adjust the start and end points of a waveform, either manually or by using an automatic "smart trim" feature. The trim function also allows a user to remove unwanted noise or silence from a sample, or for isolating specific parts of the sample for further manipulation.

When "Play" is the selected function, the selected audio clip will play from a location where the user touches the waveform of the audio clip. Additionally, when the audio clip is played, i.e., when the user interfaces with the sound input component 208, e.g., plays a note on a virtual keyboard, the audio clip will start from the location on the waveform the user touched. The location on the waveform that the user touched is indicated by a handle. As the audio clip is played, an indicator line follows the progress of the audio along the waveform. As will be described in further detail below, each of the handles 210a . . . 210n positioned along the waveform are triggered as the audio clip is played.

When "Motion" is the selected function, a user's interactions with the waveform displayed within the audio sample visualization 204 are recorded as an automation of parameters assigned to the movement of the user. Left and right motions of the user along the waveform, i.e., horizontal movement, control temporal parameters, and up and down motions of the user on the waveform, i.e., vertical movement, modulate one or more other, non-temporal parameters. The default parameters modulated by the up and down motions are determined based on the type of synthesis selected, e.g., "Granular", "Additive", and "Spectral". Parameters that may be assigned to the up and down motions include, "Symmetry", "Size", "Density", and "Pitch Variable".

When "Trim" is the selected function, the waveform of the audio clip may be trimmed or otherwise modified by tapping on the waveform to adjust a start point and/or an end point of the waveform.

Modes that are available for selection within the interface for the audio sample visualization 204 may include "Classic", "Loop", "Scrub", "Bow", and "Arp". The modes that are available depend on the function that is selected. Not all modes are available in all functions.

The "Classic" mode is a standard mode that offers a wide range of synthesis methods, including additive, spectral, and granular synthesis. The "Classic" mode is designed for traditional synth sounds and complex sound design. When the audio sampling application is in "Classic" mode, and a user touches a location on the waveform of the audio clip anywhere along the waveform, an indicator or handle is displayed where the user touched, and the audio clip will play from that location.

The "Loop" mode creates a loop from a selected portion of the audio clip. The "Loop" mode is designed for working with loop-based samples, such as drum loops or melodic loops. The "Loop" mode includes features such as a beat-slicing engine and time-stretching. When the audio sampling application is in "Loop" mode, and a user touches anywhere along the waveform, an indicator for where the user touched the waveform is displayed on the waveform, identifying a start point for the loop. A marker defining an end point for the loop is also displayed along the waveform. The distance between the indicator and the marker is the section of the audio clip that defines the loop. The position of the indicator and the position of the marker may be moved relative to the waveform and each other by touching and holding the respective interface element and moving the interface element relative to the waveform and/or relative to the other interface element.

The "Scrub" mode allows a user to scrub through a sample waveform in real-time, much like with a vinyl record or tape. When the "Play" function is selected for the audio sampling application and the application is in "Scrub" mode, a user can touch the waveform in the audio sample visualization 204 and drag along the waveform to play the sample at the same speed and direction of the finger movement. The "Scrub" mode allows a user to easily locate and isolate specific sounds or parts of sounds of the audio clip, and to manipulate the isolated sounds or parts in real time. When the "Motion" function is selected for the audio clip and the application is in "Scrub" mode, the movement of the user along the waveform may be recorded as an automation of parameters that can be assigned to a handle and triggered during playing of the music clip.

The "Arp" mode is an arpeggiator mode that automatically plays a series of notes in a pattern based on the chords or notes that a user plays.

As noted above, one or more handles 210a . . . 210n may be displayed along the waveform of the audio clip in the audio sample visualization 204. The audio sample visualization 204 may include interface elements for indicating which of the one or more handles 210a . . . 210n is actively displayed on the waveform, and allowing a user to select one or more of the handles that is not actively displayed, or unselecting one or more handles that are actively displayed. The presence of a handle on the waveform is indicated by highlighting the interface element representing the handle. The one or more handles 110a . . . 110n may be positioned anywhere along the waveform.

As will be described in further detail below, an automation may be assigned to one or more handles of the handles 110a . . . 110n. Multiple handles may have the same automation or each handle may have its own automation. As an audio clip is played, an automation for each handle positioned on the waveform is triggered as the indicator bar traverses the waveform and passes over the location of each handle on the waveform. As each handle is triggered, the audio clip and the automation assigned to the respective handles are played together. The recording of the automation is independent of the location on the waveform that the movement of the user was performed. Multiple handles may be positioned on the waveform at the same time location. In this manner, the multiple handles positioned at the same time location are triggered simultaneously during playing of the audio clip.

The parameter panel 206 is an interface for manipulating multiple parameters of the audio clip. The parameter panel 206 may be maximized to present a full panel view, the parameter panel 206 may be minimized to present an abbreviated or truncated panel view, or the parameter panel 206 may be closed. The parameter panel 206 includes a myriad of interface element. When in full panel view, the interface elements may include faders for adjusting a given parameter. When in the truncated panel view, the faders may be replaced with knobs to reduce the space taken up by the interface elements, see, for example, parameter controls 324 in FIG. 3.

The parameter panel 206 may also include interface elements for selecting a form of synthesis. Forms of synthesis available for selection may include "Granular", "Additive", and "Spectral". Granular synthesis involves breaking down an audio clip into tiny "grains" and manipulating the grains in various ways, such as changing their pitch, duration, or density. Granular synthesis allows the creation of a wide range of complex and evolving textures and sounds, and is often used for ambient and experimental music.

Additive synthesis involves combining multiple sine waves or "partials" to create a more complex waveform. By adjusting the level, frequency, and phase of each partial, a user can create a wide range of different sounds, from traditional synth sounds to complex harmonics and timbres. Spectral synthesis involves analyzing and manipulating the spectral content of an audio clip. By adjusting the amplitude and frequency of different frequency bands, a user can create complex and evolving spectral shapes and textures.

As described above, the interface elements in the parameter panel 206 may be associated with a vertical position of one or more of handles 210a . . . 210n. Vertical movement, i.e., up and down movement of the one or more handles 210a . . . 210n adjusts or modulates the associated parameter. As each parameter is adjusted, a knob representing each of the parameters rotates or otherwise provides indication that the parameter is being adjusted.

The input control panel 206 displays a method for a user to play the selected audio clip. In embodiments, the input control panel 206 includes a keyboard layout for touch interfacing by a user. The user engageable touch interface elements are displayed as keys that are "playable" by the user to plays the selected audio clip. The touch interface allows multiple keys to be played simultaneously. The ability to play more than one key at a time is a function that is not available with a traditional point and select cursor.

Figure 3:
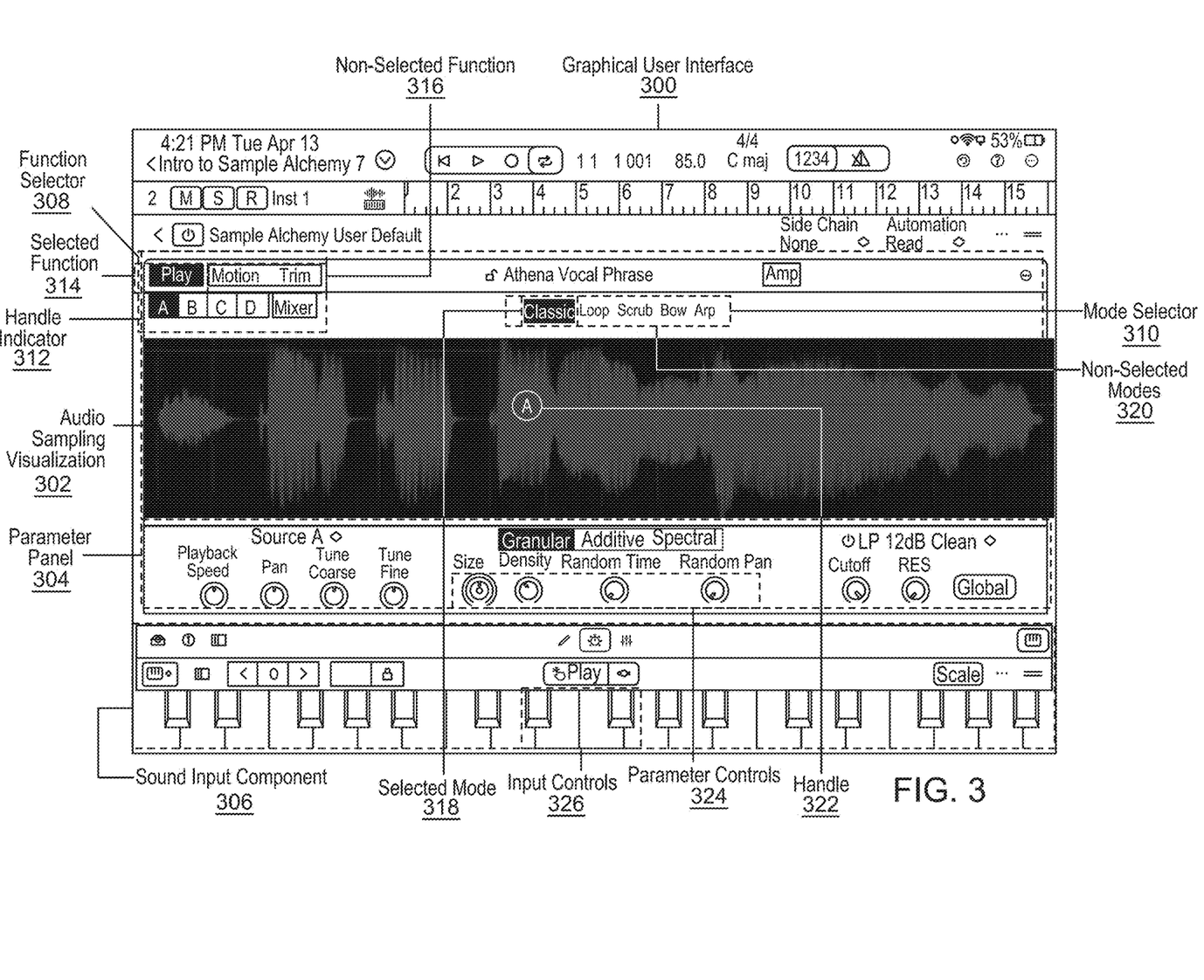
FIG. 3 is a screenshot illustrating touch interface elements of media production application.

FIG. 3 illustrates a screenshot of a graphic user interface of a media production application. A graphical user interface 300 of the media production application includes interfaces for an audio sampling visualization 302, a parameter panel 304, and sound input control 306.

The audio sampling visualization 302 displays a waveform of a selected audio clip. The audio sampling visualization 302 includes a function selector 308, a mode selector 310, and a handle selector 312. The function selector 308 displays and identifies a selected function 314. As shown, the selected function 314 is identified as "Play". The play function allows a user to play and manipulate the pitch and timing of a sample or synthesizer sound using the sound input control component 306 or other controller. The play function also allows a user to adjust various parameters such as pitch, velocity, and timing, as well as apply effects such as reverb or delay.

Selection of the "Play" function, causes the selected audio clip play from a location where a user touches the waveform of the audio clip. Additionally, when the audio clip is played, i.e., when the user interfaces with the sound input component 306, e.g., plays a note on a virtual keyboard, the audio clip will start from the location on the waveform the user touched. The location on the waveform that the user touched is indicated by handle 322. As the audio clip is played, an indicator line follows the progress of the audio along the waveform. The handle 322 is triggered, i.e., the automation assigned to the handle, as the audio clip is played.

The non-selected functions 316 in the function selector 308 include "Motion". As described above, selection of the "Motion" function, allows recording of a user's interactions with a waveform displayed within the audio sample visualization 302 as an automation of parameters assigned to the vertical and horizontal movements of the user. Left and right motions along the waveform, i.e., horizontal movement, control temporal parameters. Up and down motions on the waveform, i.e., vertical movement, modulate one or more other parameters. The default parameters modulated by the vertical movements are determined based on the type of synthesis selected. Other parameters that may be assigned to the vertical movement of the user include, size, density, symmetry, and pitch variable.

The mode selector 310 displays various modes for user selection. As shown, "Classic", "Loop", "Scrub", "Bow", and "Arp" modes that are available for selection within the audio sample visualization 302.

The "Classic" mode is a standard mode that offers a wide range of synthesis methods, including, as shown, "Granular", "Additive" and "Spectral" synthesis. When the audio sampling application is in "Classic" mode, and a user touches a location on the waveform of the audio clip anywhere along the waveform, that location is marked with a handle and the audio clip will play from that location.

The "Loop" mode creates a loop from a selected portion of the audio clip. The "Loop" mode is designed for working with loop-based samples, such as drum loops or melodic loops. When "Loop" is the selected mode, a user may touches anywhere along the waveform to position an indicator identifying a start point (not shown) for a loop (not show). A marker defining an end point (not shown) for the loop is displayed along the waveform. The distance between the indicator and the marker is the section of the audio clip defining the loop. The position of the indicator and the position of the marker may be moved relative to the waveform and/or relative to each other. To move either of the indicator or the marker, a user touches and holds the respective interface element and moves the interface element relative to the waveform and/or relative to the other interface element to the desired new position. The loop may be assigned to one or more handles. A different loop may be applied to each of the handles.

The "Scrub" mode allows a user to scrub through a sample waveform in real-time, much like with a vinyl record or tape. Selection of the "Scrub" mode allows a user to touch and drag on a waveform in the audio sample visualization 302 to play back the sample at the same speed and direction of the finger movement. The "Scrub" mode allows a user to easily locate and isolate specific sounds or parts of sounds of the audio clip, and to manipulate the isolated sounds or parts in real time. Recordings of the sounds created while in "Scrub" mode may be recorded, manipulated, and played back.

The "Arp" mode is an arpeggiator mode that automatically plays a series of notes in a pattern based on the chords or notes that a user plays. Selection of "Arp" mode allows a user to assign a series of notes in a pattern to one or more of the handles. The user inputs the notes while in "Arp" mode using the sound input component 306.

As noted above, one or more handles may be displayed along the waveform of an audio clip in the audio sample visualization 302. The audio sample visualization 302 includes a handle indicator 312 for indicating which of the one or more handles available to a user for selection is selected, i.e., actively displayed on the waveform. The handle indicator 312 also allows a user to select one or more of the handles that is not actively displayed, or to unselect one or more handles that are actively displayed. The inclusion of a handle on the waveform is indicated by highlighting or darkening of the interface element representing the handle within the handle indicator 312. As shown in FIG. 3, a handle 322, identified as "A" is positioned on the waveform of the selected clip. The handle indicator 312 indicates that the handle 322 is selected by darkening of the background of the interface element for the handle 322.

An automation may be assigned to the handle 322. In this manner, as an audio clip is played, the automation for the handle 322 is triggered as the indicator bar traverses the waveform and passes over the location of the handle 322 on the waveform. As the handle 322 is triggered, the audio clip and the automation assigned to the handle 122 are played together. The recording of the automation is independent of the location on the waveform where the movement was performed during recording.

The parameter panel 304 includes interface elements for selecting a form of synthesis. Forms of synthesis indicated as available for selection when the "Function" mode is selected include, "Granular", "Additive", and "Spectral". Granular synthesis involves breaking down an audio clip into tiny "grains" and manipulating the grains in various ways, such as changing their pitch, duration, or density. Granular synthesis allows the creation of a wide range of complex and evolving textures and sounds, and is often used for ambient and experimental music. Additive synthesis involves combining multiple sine waves or "partials" to create a more complex waveform. By adjusting the level, frequency, and phase of each partial, a user can create a wide range of different sounds, from traditional synth sounds to complex harmonics and timbres. Spectral synthesis involves analyzing and manipulating the spectral content of an audio clip. By adjusting the amplitude and frequency of different frequency bands, a user can create complex and evolving spectral shapes and textures.

The parameter panel 304 includes input controls 326. As shown in FIG. 3, the parameter panel 304 in a truncated or abbreviated view to minimize the amount of space the interface occupies while allowing for control of the various variables. As shown, the input controls 326 include knobs. When the parameter panel 304 is in an expanded or full view, the input controls 326 may include faders.

During recording of an automation, one or more of the input controls 326 may be associated with a vertical position of handle 322. Vertical movement, i.e., up and down movement of the handle 322 adjusts or modulates the associated parameter. As the one or more parameters represented by the input controls 326 is adjusted through the up and down motions of the user on the waveform, the one or more knobs representing the one or more parameters associated with the vertical movement of the user rotate indicate modulation of the parameter is modulated. More particularly, in some embodiments, an upward motion is indicated by one or more of the knobs rotating in a clockwise direction and a downward motion is indicated by the one or more knobs rotating in a counter-clockwise direction.

The sound control panel 306 displays a method for a user to play the selected audio clip. In embodiments, the sound input component 306 includes a virtual keyboard with a touch interfacing for interaction by a user. The user engageable touch interface elements are displayed as keys that are "playable" by the user in a manner similar to a traditional keyboard, to play the selected audio clip. The touch interface allows multiple keys to be played simultaneously. More particularly, multiple fingers on one or both hands may be used to play different keys on the keyboard. The ability to play more than one key at a time is a function that is made available because of the touch interface, and is not available with a traditional point and select cursor controls.

Figure 4:
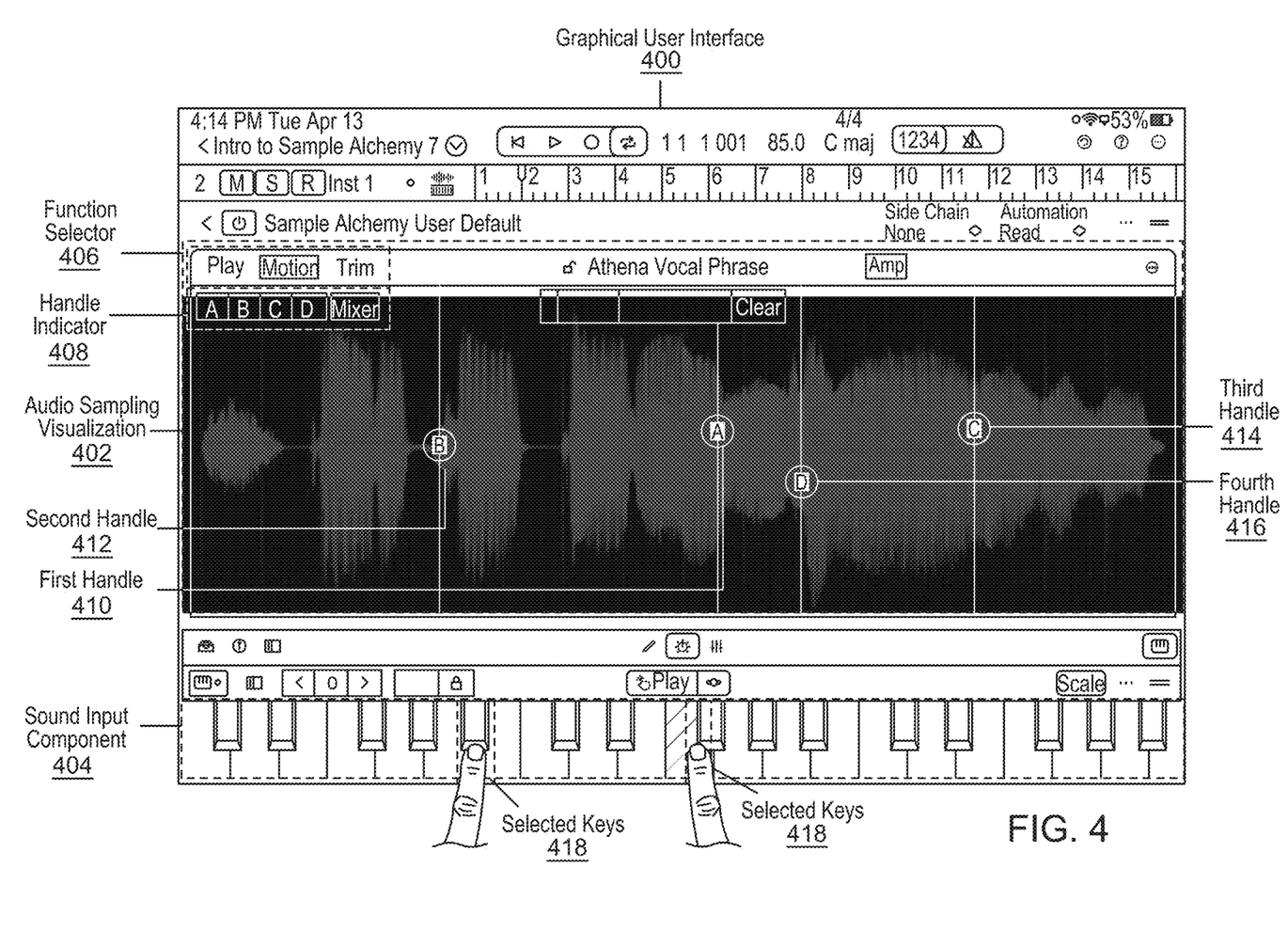
FIG. 4 is a screenshot illustrating the use of multiple handles in a media production application.

FIG. 4 illustrates a screenshot of a graphical user interface of a media production application including multiple handles. Graphical user interface 400 includes interfaces for an audio sampling visualization 402 and sound input component 404. The interface for the audio sampling visualization 402 displays a waveform of a selected audio clip. The interface further includes a function selection 406 for selecting a function and a handle indicator 408 for displaying selected and unselected handles. As described above, selectable functions include "Play", "Motion", and "Trim".

As shown, the handle indicator 408 indicates that a first handle 410, identified as "A", a second handle 412, identified as "B", a third handle 414, identified as "C", and a fourth handle, identified as "D", are positioned on the waveform are selected. Selection of the respective first, second, third, and fourth handles 410, 412, 414, 416 is indicated by highlighting or darkening of the background of the respective handle in the handle indicator 408. A user may unselect a handle by tapping on the interface element for the handle in the handle indicator 408. Unselecting a handle in the handle indicator 408 will remove the handle from its position on the waveform.

Each of the first, second, third, and fourth handles 410, 412, 414, 416 may be assigned an automation. As described above, automations are created using the "Motion" function while in "Scrub" mode. As described in detail above, automations are a recording of changes in parameters over time. Horizontal movement, i.e., left and right movement, corresponds to temporal parameters, and vertical movement, i.e., up and down motion, corresponds to one or more non-temporal parameters. Recording of the movements of the user along the waveform is a recording of the parameters that will be repeated during each time the handle is triggered. In this manner, the recording is independent and separate from the portion of the audio clip over which the movements were performed. For example, a left, right, left movement in an automation represents a speed and a direction of playback when the handle is triggered. Regardless of where on the waveform the handle was positioned during recording and regardless of where the handle is currently positioned, the automation, when the handle is triggered, includes the same left, right, left movement. An up, down, up movement recorded in an automation modulates other parameters of the playback. The automation when the handle is triggered includes the up, down, up movement, i.e., the modulation of the other parameters.

The sound input component 404 displays an interface in the form of a keyboard for playing the selected audio clip as an instrument. When in "Play" mode, engaging the keys of the keyboard, as indicated by fingers pressing selected keys 418, plays the audio clip. As an indicator bar traverses the waveform and crosses the locations at which each of the first, second, third, and fourth handles 410, 412, 414, 416 are positioned, each of the respective first, second, third, and fourth handles 410, 412, 414, 416 is triggered, causing initiation of the automation assigned to the respective handle.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 5:
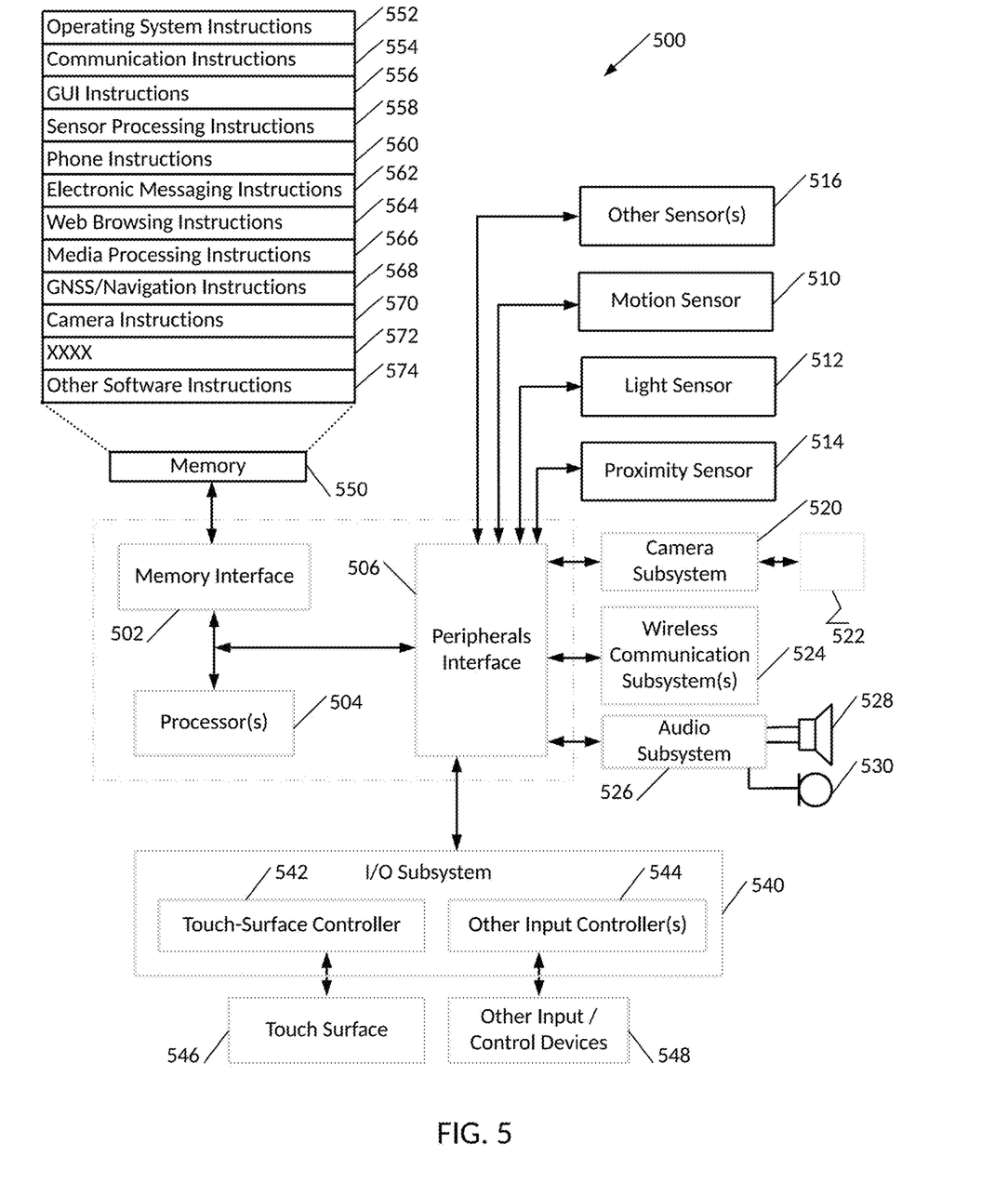
FIG. 5 is a block diagram of an example computing device that can implement the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the computing device 500 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™.

The memory interface 502 can be coupled to memory 550. The memory 550 can include high-speed random-access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing an auto-advancing of an instruction panel upon detection an operation has been performed. For example, operating system 552 can implement the auto-advancing features as described with reference to FIG. 1.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store software instructions 572 to facilitate other processes and functions, such as the auto-advancing processes and functions as described with reference to FIG. 1.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What is claimed is:

1. A method comprising:
   executing an application, in a learning mode, to display an interactable graphical user interface (GUI) that provides functions available in a non-learning mode;
   selecting a tutorial from a collection of tutorials for presenting to a user;
   concurrently with displaying the interactable GUI, displaying an instruction panel comprising a first set of tutorial instructions from the tutorial for the user to perform operations for interacting with the interactable GUI;
   concurrently with displaying the interactable GUI and instruction panel, displaying a visual cue that illustrates a touch screen action that the user is to perform in association with the first set of tutorial instructions, the visual cue being (a) positioned at a location within the interactable GUI where the touch screen action is to be performed and (b) comprising an animation that corresponds to a user movement representing the touch screen action, wherein the animation includes:
   (i) a shape representing a touch of interactable GUI by the user, and
   (ii) a plurality of lines adjacent the shape indicating movement;
   monitoring user interactions with the interactable GUI to determine whether the first set of tutorial instructions has been completed; and
   in response to determining that the user interactions with the interactable GUI completed the first set of tutorial instructions, updating the instruction panel to display a second set of tutorial instructions.

2. The method of claim 1, further comprising:
   changing a location of the instruction panel to accommodate display of the visual cue.

3. The method of claim 2, wherein changing the location of the instruction panel includes, tapping and holding on the instruction panel to engage the instruction panel, and while holding on the instruction panel, moving the instruction panel to a new location.

4. The method of claim 2, wherein changing the location of the instruction panel is performed automatically when the instruction panel obstructs the display of the visual cue.

5. The method of claim 1, further comprising:
   detecting a user interaction with the interactable GUI that should not have been performed; and
   providing an alert in response to the detection that the user interaction should not have been performed.

6. The method of claim 1, further comprising:
   blocking functions of the application when in learning mode, wherein these functions are available in standard mode.

7. The method of claim 1, wherein the visual cue indicates a swiping action.

8. The method of claim 1, wherein the shape representing a touch of interactable GUI by the user includes a circle.

9. The method of claim 8, wherein the plurality of lines adjacent the shape indicating movement are curved.

10. A non-transitory computer-readable medium including one or more sequences of instructions that, when executed by one or more processors, cause the processors to perform operations comprising:
    executing an application, in a learning mode, to display an interactable graphical user interface (GUI) that provides functions available in a non-learning mode;
    selecting a tutorial from a collection of tutorials for presenting to a user;

concurrently with displaying the interactable GUI, displaying an instruction panel comprising a first set of tutorial instructions for a user to perform operations for interacting with the interactable GUI;

concurrently with displaying the interactable GUI and instruction panel, displaying a visual cue that illustrates a touch screen action that the user is to perform in association with the first set of tutorial instructions, the visual cue being (a) positioned at a location within the interactable GUI where the touch screen action is to be performed and (b) comprising an animation that corresponds to a user movement representing the touch screen action, wherein the animation includes:

(i) a shape representing a touch of interactable GUI by the user, and (ii) a plurality of lines adjacent the shape indicating movement;

monitoring user interactions with the interactable GUI to determine whether the first set of tutorial instructions has been completed; and in response to determining that the user interactions with the interactable GUI completed the first set of tutorial instructions, updating the instruction panel to display a second set of tutorial instructions.

11. The medium of claim 10, wherein the operations further comprise:

changing a location of the instruction panel to accommodate display of the visual cue.

12. The medium of claim 11, wherein changing the location of the instruction panel includes, detecting the user tapping and holding on the instruction panel to engage the instruction panel, and while detecting the user holding on the instruction panel, detecting the user moving the instruction panel to a new location.

13. The medium of claim 11, wherein changing the location of the instruction panel is performed automatically when the instruction panel obstructs the display of the visual cue.

14. The medium of claim 10, wherein the operations further comprise:

detecting a user interaction with the interactable GUI that should not have been performed; and providing an alert in response to the detection that the user interaction should not have been performed.

15. The medium of claim 10, wherein the operations further comprise:

blocking functions of the application when in learning mode, wherein these functions are available in standard mode.

16. A system comprising:

one or more processors; and a non-transitory computer-readable medium including one or more sequences of instructions that, when executed by one or more processors, cause the processors to perform operations comprising:

executing an application, in a learning mode, to display an interactable graphical user interface (GUI) that provides functions available in a non-learning mode;

selecting a tutorial from a collection of tutorials for presenting to a user;

concurrently with displaying the interactable GUI, displaying an instruction panel comprising a first set of tutorial instructions for the user to perform operations for interacting with the interactable GUI;

concurrently with displaying the interactable GUI and instruction panel, displaying a visual cue that illustrates a touch screen action that the user is to perform in association with the first set of tutorial instructions, the visual cue being (a) positioned at a location within the interactable GUI where the touch screen action is to be performed and (b) comprising an animation that corresponds to a user movement representing the touch screen action, wherein the animation includes:

(i) a shape representing a touch of interactable GUI by the user, and (ii) a plurality of lines adjacent the shape indicating movement;

monitoring user interactions with the interactable GUI to determine whether the first set of tutorial instructions has been completed; and in response to determining that the user interactions with the interactable GUI completed the first set of tutorial instructions, updating the instruction panel to display a second set of tutorial instructions.

17. The system of claim 16, wherein the operations further comprise:

changing a location of the instruction panel to accommodate display of the visual cue.

18. The system of claim 17, wherein changing the location of the instruction panel includes, detecting the user tapping and holding on the instruction panel to engage the instruction panel, and while detecting the user holding on the instruction panel, detecting the user moving the instruction panel to a new location.

19. The system of claim 17, wherein changing the location of the instruction panel is performed automatically when the instruction panel obstructs the display of the visual cue.

20. The system of claim 16, wherein the operations further comprise:

detecting a user interaction with the interactable GUI that should not have been performed; and providing an alert in response to the detection that the user interaction should not have been performed.

* * * * *